United States Patent
Osawa

(10) Patent No.: US 7,608,940 B2
(45) Date of Patent: Oct. 27, 2009

(54) POWER SUPPLY DEVICE AND METHOD OF CONTROLLING THE SAME

(75) Inventor: Ken Osawa, Kanagawa (JP)

(73) Assignee: Panasonic EV Energy Co., Ltd., Kosai-Shi (JP)

( * ) Notice: Subject to any disclaimer, the term of this patent is extended or adjusted under 35 U.S.C. 154(b) by 222 days.

(21) Appl. No.: 11/611,760

(22) Filed: Dec. 15, 2006

(65) Prior Publication Data

US 2007/0139005 A1 Jun. 21, 2007

(30) Foreign Application Priority Data

Dec. 16, 2005 (JP) ............................... 2005-363640

(51) Int. Cl.
*H02H 7/18* (2006.01)
*H02J 7/00* (2006.01)
*H02H 7/08* (2006.01)
*H02H 7/09* (2006.01)

(52) U.S. Cl. .................. 307/10.7; 320/127; 361/23; 361/33

(58) Field of Classification Search ................ 320/112, 320/127; 307/10.7; 361/1–8, 10, 23, 33; 903/903

See application file for complete search history.

(56) References Cited

U.S. PATENT DOCUMENTS

2006/0007622 A1* 1/2006 Furukawa et al. ........... 361/115

FOREIGN PATENT DOCUMENTS

JP 2000-134707 5/2000

\* cited by examiner

*Primary Examiner*—Edward Tso
*Assistant Examiner*—Richard V Muralidar
(74) *Attorney, Agent, or Firm*—Workman Nydegger

(57) ABSTRACT

A power supply device and a method for controlling the power supply device in which a fusion checking process for the cathode side relay and the anode side relay is easily performed within a short period of time. A battery ECU (controller) measures a first voltage between a high potential output terminal and an anode terminal of the rechargeable battery when a cathode side relay arranged between the high potential output terminal and a cathode terminal of the rechargeable battery and an anode side relay arranged between a low potential output terminal and the anode terminal of the rechargeable battery are open to determine whether or not a cathode side relay is fused. The battery ECU also measures a second voltage between the low potential output terminal and the cathode terminal of the rechargeable battery to determine whether or not the anode side relay is fused.

8 Claims, 4 Drawing Sheets

(a) IG (b) Anode Side Main Relay 54

(c) Cathode Side Main Relay 53

(d) Precharge Relay 55

POWER SUPPLY DEVICE AND METHOD OF CONTROLLING THE SAME

CROSS-REFERENCE TO RELATED APPLICATIONS

This application is based upon and claims the benefit of priority from prior Japanese Patent Application No. 2005-363640, filed on Dec. 16, 2005, the entire contents of which are incorporated herein by reference.

BACKGROUND OF THE INVENTION

The present invention relates to a power supply device for installation in an apparatus and including a rechargeable battery, and a method for controlling the power supply device.

A power supply device including a rechargeable battery is nowadays often used in various kinds of applications as a power source having superior recycling, economic, and environmental. Specifically, a power supply device including a rechargeable battery is installed in, for example, a hybrid electric vehicle (HEV) using an engine and a motor as a power source. The rechargeable battery is discharged to supply power to apparatuses such as a motor or an air conditioner in the HEV. The motor also functions as a power generator in the HEV. That is, the motor regenerates power when the vehicle is braking or decelerating to charge the rechargeable battery. In this manner, energy, which is released into the atmosphere as heat in a conventional vehicle, is accumulated in the rechargeable battery of the power supply device. This improves energy efficiency and drastically increases fuel efficiency in comparison with a conventional vehicle.

Japanese Laid-Open Patent Publication No. 2000-134707 discloses an example of a power supply device including a cathode side relay and an anode side relay respectively connected to a cathode terminal and an anode terminal of a rechargeable battery. The cathode side relay and anode side relay connect the rechargeable battery and apparatus powered by the rechargeable battery to improve the safety of the power supply device and the apparatus. If abnormal current, such as a short-circuit, flows in the apparatus, the cathode side relay and the anode side relay are switched to an open state to electrically disconnect the apparatus from the rechargeable battery of the power supply device. This prevents abnormal current from flowing into the rechargeable battery. Thus, abnormalities and damage do not occur in the rechargeable battery.

Furthermore, the cathode side relay and the anode side relay include contacts susceptible to fusion resulting from wear or arcs produced during switching operations. When such a fusion occurs, the contact cannot be switched from a closed state to an open state. Therefore, in the prior art power supply device, a fusion checking process is conducted on the cathode side relay and the anode side relay when performing an operation for starting the vehicle to check for abnormalities (fusions) in the cathode side relay and the anode side relay.

The prior art power supply device and relay fusion checking process will now be described in detail with reference to FIGS. 1 and 2.

FIG. 1 is a block diagram showing the structure of a prior art power supply device, and FIG. 2 is a timing chart showing the relay fusion checking process for the prior art power supply device shown in FIG. 1.

The structure of the prior art power supply device will first be described with reference to FIG. 1.

As shown in FIG. 1, the prior art power supply device 1 includes a battery electronic control unit (ECU) 50, which functions as a controller, and a rechargeable battery 51, which includes a plurality of series-connected cells. The prior art power supply device 1 further includes a cathode side relay, which includes a main relay 53 and a precharge relay 55, and a main relay 54, which functions as an anode side relay. The main relays 53 and 54 and the precharge relay 55 each have a first terminal and a second terminal. The first terminal of the main relay 53 is directly connected to the cathode terminal of the rechargeable battery 51, and the first terminal of the precharge relay 55 is connected to the cathode terminal of the rechargeable battery 51 via a resistor 56. The first terminal of the main relay 54 is directly connected to the anode terminal of the rechargeable battery 51.

The second terminal of each of the main relays 53 and 54 and the precharge relay 55 is connected to a motor 52 and a capacitor 57 arranged in a vehicle (apparatus) side. The battery ECU 50 of the prior art power supply device 1 switches the main relays 53 and 54 and the precharge relay 55 between an open state and a closed state to enable or stop the supply of power from the rechargeable battery 51 to the motor 52 and the capacitor 57.

In the prior art power supply device 1, a voltmeter 58 is arranged between the two terminals of the capacitor 57 to measure the voltage of the capacitor 57. The battery ECU 50 uses the charge voltage value of the capacitor 57 measured by the voltmeter 58 to conduct the fusion checking process for the main relays 53 and 54 and the precharge relay 55.

The relay fusion checking process for the prior art power supply device 1 will now be described in detail with reference to FIG. 2.

In FIG. 2, when an ignition key IG arranged in the vehicle side is turned ON at time t1, the battery ECU 50 monitors the output from the voltmeter 58, that is, the charge voltage of the capacitor 57 as the measured voltage Vc. When the measured voltage Vc becomes greater than 0 volts before time t2 at which the precharge relay 55 is switched to a closed state (ON state), the battery ECU 50 determines that the anode side main relay 54 and either one of the main relay 53 and the precharge relay 55 at the cathode side relay are fused.

After closing the precharge relay 55, the battery ECU 50 determines that the anode side main relay 54 is fused if the measured voltage Vc becomes greater than 0 volts before time t3 at when the anode side main relay 54 is switched to the closed state. That is, the fusion checking process of the anode side relay is performed based on changes in the charge voltage of the capacitor 57 between time t2 and time t3 in the prior art power supply device.

Power is supplied to the capacitor 57 by maintaining the precharge relay 55 and the anode side main relay 54 in the closed state. Then, the battery ECU 50 switches only the precharge relay 55 to an open state (OFF state) at time t4 to stop the supply of power to the capacitor 57. The battery ECU 50 stores a measured voltage Vc1 at time t4. The battery ECU 50 maintains only the anode side main relay 54 in the closed state so that discharging occurs from the capacitor 57 toward the motor 52.

Subsequently, the battery ECU 50 closes the precharge relay 55 at time t5 and stores a measured voltage Vc2 acquired at time t5. Further, the battery ECU 50 obtains the difference between the stored measured voltage Vc2 and measured voltage Vc1 to determine that the main relay 53 or the precharge relay 55 at the cathode side is fused when the voltage difference (Vc2−Vc1) is greater than or equal to 0 volts. In other words, the battery ECU 50 determines that the main relay 53 or the precharge relay 55 at the cathode side is fused if the charge voltage of the capacitor 57 rises when maintaining only the anode side main relay 54 in the closed state. In this manner, the fusion checking process of the cathode side relay is performed based on changes in the charge voltage of the capacitor 57 between time t4 to time t5 in the prior art power supply device 1. Afterwards, in the prior art power supply device 1, the battery ECU 50 closes the cathode side main relay 53 at time t6 and then opens the precharge relay 55 at point t7 to start actual power supply to the motor 52.

However, in the prior art power supply device 1, the fusion checking process for the cathode side relay and the anode side relay is performed based on changes in the charge voltage of the capacitor 57 arranged in the vehicle (apparatus) side. Thus, conditions for performing determination during the fusion checking process are dependent on the load of the apparatus. That is, in the prior art power supply device 1, to perform the fusion checking process, at least either one of the precharge relay 55 and the anode side main relay 54 must be closed and at least either one of the cathode terminal and the anode terminal of the rechargeable battery 51 must be electrically connected to the apparatus. Furthermore, the voltmeter 58 must be replaced in accordance with the capacitance of the capacitor 57 or the type of motor 52 connected to the capacitor 57. In particular, if the prior art power supply device 1 is connected to an apparatus that does not have the capacitor 57, an exclusive capacitor must be arranged between the power supply device 1 and the apparatus in addition to the voltmeter 58. Furthermore, the prior art power supply device 1 closes the precharge relay 55 or the anode side main relay 54. Thus, the fusion checking process is performed at different timings for the cathode side relay and the anode side relay.

As described above, the fusion checking process for the cathode side relay and the anode side relay is dependent on the apparatus in the prior art power supply device 1. Further, the fusion checking process is complicated, takes much time, and requires much work.

SUMMARY OF THE INVENTION

The present invention provides a power supply device and a method for control that enables a fusion checking process for a cathode side relay and an anode side relay to be easily performed within a short period of time.

One aspect of the present invention is a device for supplying power to an apparatus. The device includes a rechargeable battery having a cathode terminal and an anode terminal, a high potential output terminal for connection to the apparatus, and a low potential output terminal for connection to the apparatus. A cathode side relay is arranged between the cathode terminal of the rechargeable battery and the high potential output terminal. An anode side relay is arranged between the anode terminal of the rechargeable battery and the low potential output terminal. A controller switches each of the cathode side relay and the anode side relay between an open state and a closed state. The controller measures a first voltage between the high potential output terminal and the anode terminal of the rechargeable battery when the cathode side relay and the anode side relay are set in the open state to determine whether or not the cathode side relay is fused. The controller measures a second voltage between the low potential output terminal and the cathode terminal of the rechargeable battery when the cathode side relay and the anode side relay are set in the open state to determine whether or not the anode side relay is fused.

A further aspect of the present invention is a method for controlling a power supply device including a rechargeable battery having a cathode terminal and an anode terminal. The power supply device includes a high potential output terminal and a low potential output terminal connected to an apparatus for power supply thereto. A cathode side relay is arranged between the cathode terminal of the rechargeable battery and the high potential output terminal. An anode side relay is arranged between the anode terminal of the rechargeable battery and the low potential output terminal. The method includes the steps of setting the cathode side relay in an open state, setting the anode side relay in an open state, measuring a first voltage between the high potential output terminal and the anode terminal of the rechargeable battery while maintaining the cathode side relay and the anode side relay in the open state, measuring a second voltage between the low potential output terminal and the cathode terminal of the rechargeable battery while maintaining the cathode side relay and the anode side relay in the open state, determining whether or not the cathode side relay is fused based on the measured first voltage, and determining whether or not the anode side relay is fused based on the measured second voltage.

Another aspect of the present invention is a product for use with a computer for controlling a power supply device including a rechargeable battery having a cathode terminal and an anode terminal. The power supply device includes a high potential output terminal and a low potential output terminal connected to an apparatus for power supply thereto. A cathode side relay is arranged between the cathode terminal of the rechargeable battery and the high potential output terminal. An anode side relay is arranged between the anode terminal of the rechargeable battery and the low potential output terminal. The product includes a computer-readable medium encoded with program logic which when executed by the computer causes the computer to perform steps including setting the cathode side relay in an open state, setting the anode side relay in an open state, measuring a first voltage between the high potential output terminal and the anode terminal of the rechargeable battery while maintaining the cathode side relay and the anode side relay in the open state, measuring a second voltage between the low potential output terminal and the cathode terminal of the rechargeable battery while maintaining the cathode side relay and the anode side relay in the open state, determining whether or not the cathode side relay is fused based on the measured first voltage, and determining whether or not the anode side relay is fused based on the measured second voltage.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
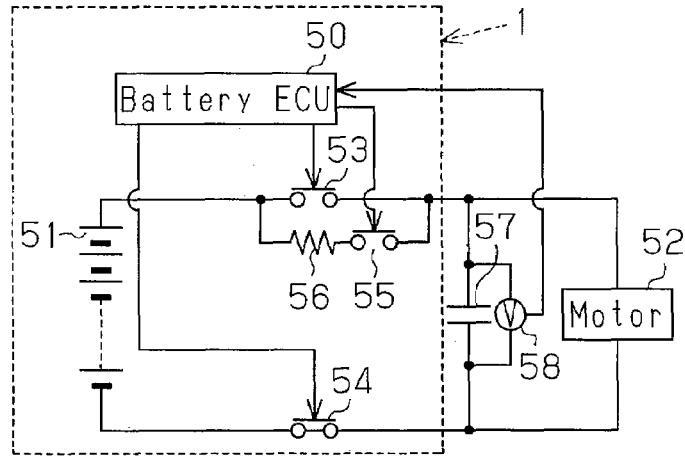
FIG. 1 is a block diagram showing the structure of a prior art power supply device.
Figure 2:
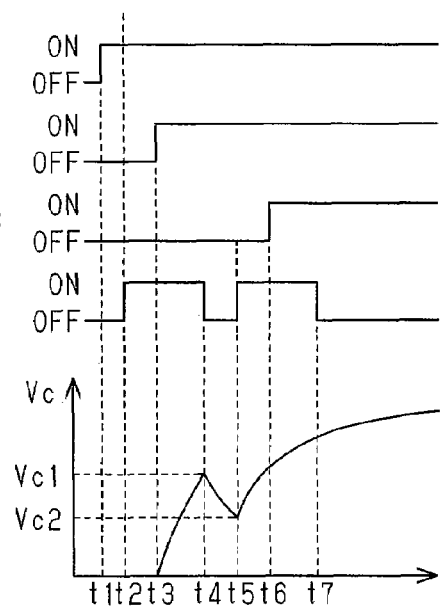
FIG. 2 is a timing chart showing a relay fusion checking process in the prior art power supply device shown in FIG. 1.

In the drawings, like numerals are used for like elements throughout.

A power supply device and method for controlling the power supply device according to a preferred embodiment of the present invention will now be described with reference to the drawings. In the preferred embodiment, the power supply device of the present invention is applied to an HEV by way of example.

Figure 3:
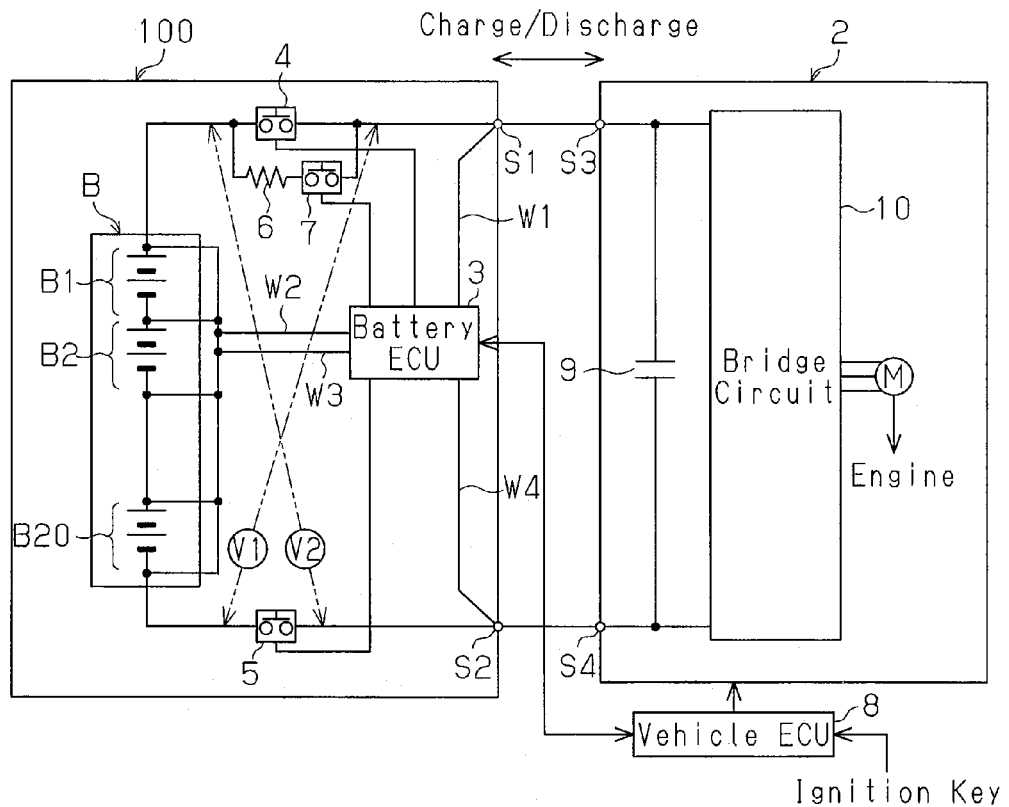
FIG. 3 is a diagram showing a power supply device according to a preferred embodiment of the present invention and main parts of a vehicle incorporating the power supply device.

FIG. 3 is a diagram showing the power supply device 100 of the present invention and main parts of a vehicle incorporating the power supply device 100. In FIG. 3, the power supply device 100 of the present embodiment includes a rechargeable battery B and a battery ECU 3 for controlling the output of the rechargeable battery B. The power supply device 100 supplies power to a motor driving unit 2, which serves as an apparatus (external device) installed in the HEV. More specifically, the power supply device 100 has a high potential output terminal S1 and a low potential output terminal S2 respectively connected to a cathode terminal and an anode terminal of the rechargeable battery B. The high potential output terminal S1 and the low potential output terminal S2 are respectively connected to a high potential input terminal S3 and a low potential input terminal S4, which are arranged in the motor driving unit 2. The power supply device 100 drives the motor M by supplying power to the motor driving unit 2 via the high potential output terminal S1 and the low potential output terminal S2.

In detail, the motor driving unit 2 includes a motor M, which functions as a power source for the HEV with an internal combustion engine, and a smoothing capacitor 9 and bridge circuit 10, which are arranged in an inverter circuit (not shown) for inverter-driving the motor M. The capacitor 9 and the bridge circuit 10 each have a first terminal and a second terminal. The first terminals of the capacitor 9 and the bridge circuit 10 are connected to the high potential input terminal S3. The second terminals of the capacitor 9 and bridge circuit 10 are connected to the low potential input terminal S4. The power supply device 100 discharges the rechargeable battery B to generate power and supplies the power to the motor M in the motor driving unit 2. The motor M, which is supplied with power, is driven in accordance with an instruction signal from a vehicle ECU 8, which functions as a control unit for controlling the entire HEV.

The motor M also functions as a power generator. The motor M generates regenerative power when the HEV is braking or decelerating to charge the rechargeable battery B. In other words, the high potential input terminal S3 and the low potential input terminal S4 function as power supply terminals for the power supply device 100 when the motor M is performing a regenerative operation. Voltage of the regenerative power is applied to the high potential output terminal S1 and the low potential output terminal S2 of the power supply device 100 to charge the rechargeable battery B. In addition to the motor driving unit 2, the power supply device 100 may also supply power to other electric devices (not shown), such as an air conditioner installed in the HEV.

The rechargeable battery B includes a battery pack formed by a plurality of series-connected battery blocks B1, B2, . . . , and B20. The battery blocks B1 to B20 are accommodated in a battery case (not shown), which is installed in the HEV. Each battery block B1 to B20 includes two battery modules, which are electrically connected in series. Each battery module includes six cells, which are electrically connected in series. Nickel-metal hydride batteries, lithium ion batteries, and the like may be used as the cell. The quantities of the battery blocks, battery modules, and cells are not particularly limited. The configuration of the rechargeable battery B is not limited to the example described above. The quantity of the cells can easily be changed when the rechargeable battery B includes a battery pack. In this case, the amount of the power supplied by the power supply device 100 may also be easily changed. This is preferable in that the power necessary for the apparatus is easily ensured.

The power supply device 100 includes a cathode side main relay 4, an anode side main relay 5, a current limiting resistor 6, and a precharge relay 7 for precharging the capacitor 9 via the resistor 6. The main relay 4 and the precharge relay 7 each have a first terminal and a second terminal. The cathode terminal of the rechargeable battery B is connected to the first terminals of the cathode side main relay 4 and precharge relay 7. The second terminals of the main relay 4 and precharge relay 7 are connected to the high potential output terminal S1. The precharge relay 7 is connected in parallel to the main relay 4. The precharge relay 7 is closed before the main relay 4 when starting the supply of power (start HEV) from the power supply device 100 to the motor driving unit 2 so that the resistor 6 prevents a large inrush current from flowing from the power supply device 100 to the motor driving unit 2.

The main relay 4 and the precharge relay 7 form a cathode side relay between the cathode terminal of the rechargeable battery B and the high potential output terminal S1.

The anode side main relay 5 also has a first terminal and a second terminal. The first terminal of the main relay 5 is connected to the anode terminal of the rechargeable battery B. The second terminal of the main relay 5 is connected to the low potential output terminal S2, and the main relay 5 forms an anode side relay between the anode terminal of the rechargeable battery B and the low potential output terminal S2.

The main relays 4 and 5 and the precharge relay 7 each include an electromagnetic contactor referred to as a contactor. The main relays 4 and 5 and the precharge relay 7 are each switched between an open state (OFF state) and a closed state (ON state) in accordance with an open signal and a close signal from the battery ECU 3.

The battery ECU 3 includes a microcomputer and functions as a controller for controlling each unit of the power supply device 100. The battery ECU 3 performs bidirectional data communication with the vehicle ECU 8 to inform the vehicle ECU 8 of predetermined information related to the rechargeable battery B. The battery ECU 3 generates the open signal or the close signal in accordance with an instruction signal from the vehicle ECU 8 to switch the corresponding main relays 4 and 5 and the precharge relay 7 to the open state or closed state. The vehicle ECU 8 receives a drive signal, which corresponds to an operation performed by a user, from each part of the HEV, such as the ignition key, acceleration pedal, and brake pedal, and provides the instruction signal to the battery ECU 3 and to each part, such as the engine of the HEV, based on the received drive signal.

The battery ECU 3 also executes a fusion checking process on the cathode side relay and the anode side relay by measuring a first voltage V1, which is taken between the high potential output terminal S1 and the anode terminal of the rechargeable battery B, and a second voltage V2, which is taken between the low potential output terminal S2 and the cathode terminal of the rechargeable battery B, as shown by the arrowed double-dashed line in FIG. 3 (details described later).

The configuration of the battery ECU 3 will now be described in detail with reference to FIG. 4.

Figure 4:
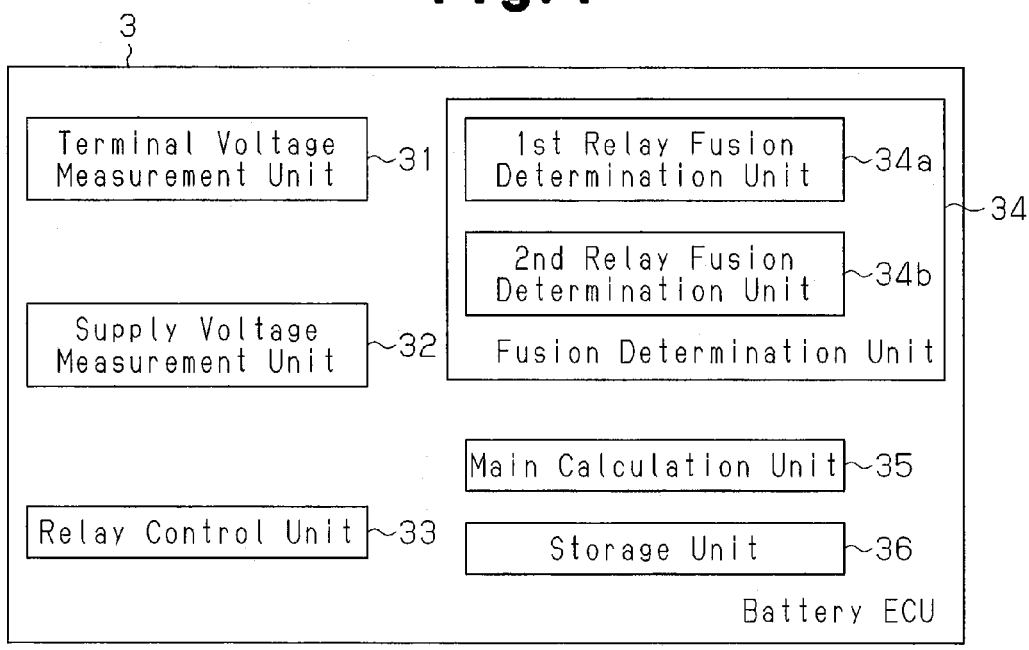
FIG. 4 is a block diagram showing the detailed structure of the battery ECU shown in FIG. 3.

FIG. 4 is a block diagram showing the configuration of the battery ECU 3 of FIG. 3.

As shown in FIG. 4, the battery ECU 3 includes a terminal voltage measurement unit 31, a supply voltage measurement unit 32, a relay control unit 33, a fusion determination unit 34, and a main calculation unit 35, each of which are functionally arranged in a CPU or an MPU of the microcomputer. The battery ECU 3 also includes a storage unit 36 formed by a memory or the like of the microcomputer.

The terminal voltage measurement unit 31 is connected to power lines W2 and W3 (FIG. 3), which are respectively connected to the cathode terminal and the anode terminal of each battery block B1 to B20 (FIG. 3) of the rechargeable battery B, to measure the potential at each terminal of the rechargeable battery B and measure the voltage between the terminals for each of the battery blocks B1 to B20. The terminal voltage measurement unit 31 appropriately stores the measured voltage (include total voltage for the entire rechargeable battery B) between the terminals in the storage unit 36. In FIG. 3, the power lines W2 and W3 are each indicated by a single line for the sake of simplicity.

The supply voltage measurement unit 32 is connected to the power lines W1 and W4 (FIG. 3), which are respectively connected to the high potential output terminal S1 (FIG. 3) and the low potential output terminal S2 (FIG. 3). The supply voltage measurement unit 32 measures the potential at the high potential output terminal S1 and the low potential output terminal S2 to measure the voltage supplied to the motor driving unit 2 (FIG. 3). Then, the supply voltage measurement unit 32 stores the measured supply voltage in the storage unit 36.

In accordance with an instruction signal provided from the vehicle ECU 8, the relay control unit 33 generates an open signal or close signal for each of the main relays 4 and 5 and the precharge relay 7 and provides the signal to the corresponding relay. Each of the main relays 4 and 5 and the precharge relay 7 are thus open or closed in accordance with an operation instruction given to the vehicle ECU 8 by the user through the ignition key. The power supply device 100 supplies power to the motor driving unit 2 when the HEV is started and stops the power supply when the HEV is stopped.

The fusion determination unit 34 includes a first relay fusion determination unit 34a, which performs the fusion checking process on the cathode side relay, and a second relay fusion determination unit 34b, which performs the fusion checking process on the anode side relay. The first relay fusion determination unit 34a refers to the storage unit 36 to obtain the difference between the potential at the high potential output terminal S1, which is measured by the supply voltage measurement unit 32, and the potential at the anode terminal of the rechargeable battery B, which is measured by the terminal voltage measurement unit 31, to measure the first voltage V1. Further, the first relay fusion determination unit 34a compares the measured first voltage V1 with a first threshold value prestored in the storage unit 36 to determine whether or not fusion has occurred in the cathode side relay, that is, at least either one of the main relay 4 or the precharge relay 7.

The second relay fusion determination unit 34b refers to the storage unit 36 to obtain the difference between the potential at the cathode terminal of the rechargeable battery B, which is measured by the terminal voltage measurement unit 31, and the potential at the low potential output terminal S2, which is measured by the supply voltage measurement unit 32, to measure the second voltage V2. The second relay fusion determination unit 34b also compares the measured second voltage V2 with a second threshold value prestored in the storage unit 36 to determine whether or not fusion has occurred in the anode side relay, that is, the main relay 5.

The main calculation unit 35 performs output control of the rechargeable battery B while managing predetermined information related to the rechargeable battery B, such as the discharging amount, charging amount, and state of charge (SOC) of the rechargeable battery B. The main calculation unit 35 also refers to the storage unit 36 to calculate the SOC or the like from the measurement result of the battery temperature of the rechargeable battery B. Further, the main calculation unit 35 obtains the tolerable charging amount of the rechargeable battery B and the upper limit value of the discharging power that can be output from the rechargeable battery B and accurately performs deterioration determination of the rechargeable battery B. Furthermore, the main calculation unit 35 provides managing information and various measurement results to the vehicle ECU 8 at a predetermined cycle or in accordance with an instruction signal from the vehicle ECU 8.

The storage unit 36 stores the control program of the present invention and various programs executed to operate different parts of the battery ECU 3. The storage unit 36 also appropriately holds measurement data obtained by each part of the battery ECU 3.

The operation of the power supply device 100 in the present embodiment will now be described in detail with reference to FIGS. 5 to 8. The fusion checking process for the cathode side relay and the anode side relay will mainly be described below.

Figure 5:
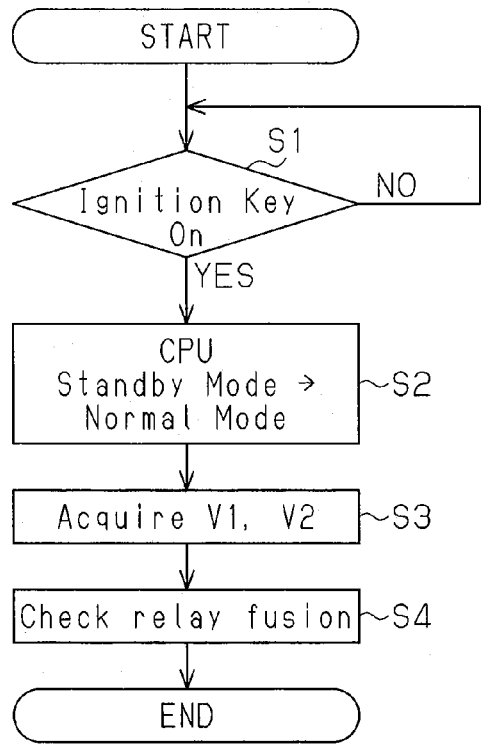
FIG. 5 is a flowchart showing the operation for starting the vehicle.
Figure 6:
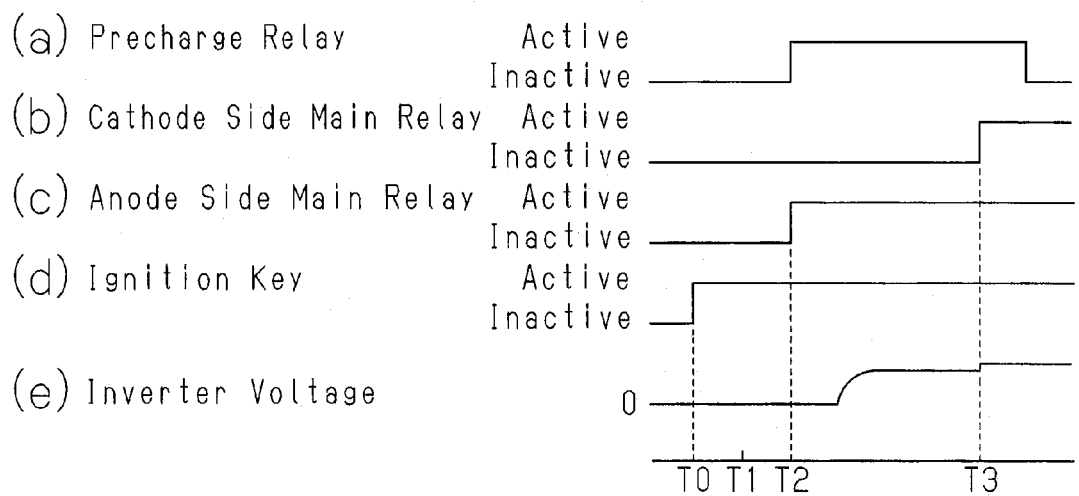
FIG. 6 is a timing chart showing the switching operation of each relay shown in FIG. 3 during the starting operation of the vehicle.
Figure 7:
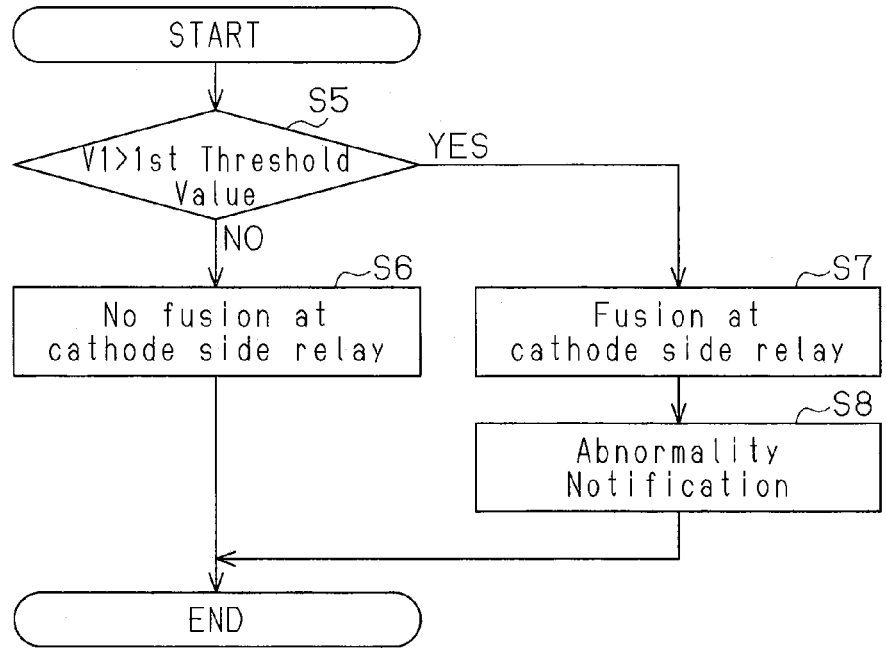
FIG. 7 is a flowchart showing a specific fusion checking process for the cathode side relay in the relay fusion checking process shown in FIG. 5.

FIG. 5 is a flowchart showing the main operations that are performed when starting the vehicle, and FIG. 6 is a timing chart showing the switching operation of the relays shown in FIG. 3 when starting the vehicle. FIG. 7 is a flowchart showing in detail a fusion checking process for the cathode side relay that is included in the relay fusion checking process shown in FIG. 5, and FIG. 8 is a flowchart showing in detail a specific fusion checking process for the anode side relay that is included in the relay fusion checking process shown in FIG. 5.

As shown in step S1 of FIG. 5, the battery ECU 3 waits in a standby mode until a start (instruction) signal, which corresponds to an ON operation of the ignition key, is provided from the vehicle ECU 8. The vehicle ECU 8 provides the battery ECU 3 with the start signal when the ignition key is switched from inactive to active by the user at time T0 shown in FIG. 6(d).

Then, in step S2 shown in FIG. 5, when the battery ECU 3 is switched from the standby mode to a normal mode, the battery ECU 3 performs an initialization process to reset predetermined values, such as the discharging amount of the rechargeable battery B, and prepare for a new power supply. After the initialization process is completed, at time T1 (FIG. 6) at which each one of the main relays 4 and 5 and the precharge relay 7 are inactive (open state), the battery ECU 3 acquires the first and second voltages V1 and V2 in step S3 shown in FIG. 5. That is, the fusion determination unit 34 reads from the storage unit 36 the potential at each of the cathode terminal and anode terminal of the rechargeable battery B (each potential in the total voltage of the rechargeable battery B), which is measured by the terminal voltage measurement unit 31, and the potential at each of the high potential output terminal S1 and low potential output terminal S2, which is measured by the supply voltage measurement unit 32. The first relay fusion determination unit 34a then subtracts the potential at the anode terminal of the rechargeable battery B from the potential at the high potential output terminal S1 to acquire the first voltage V1. The second relay fusion determination unit 34b subtracts the potential at the low potential output terminal S2 from the potential at the cathode terminal of the rechargeable battery B to acquire the second voltage V2. The fusion determination unit 34 then executes the relay fusion checking process using the acquired first and second voltages V1 and V2 in step S4 shown in FIG. 5.

Figure 8:
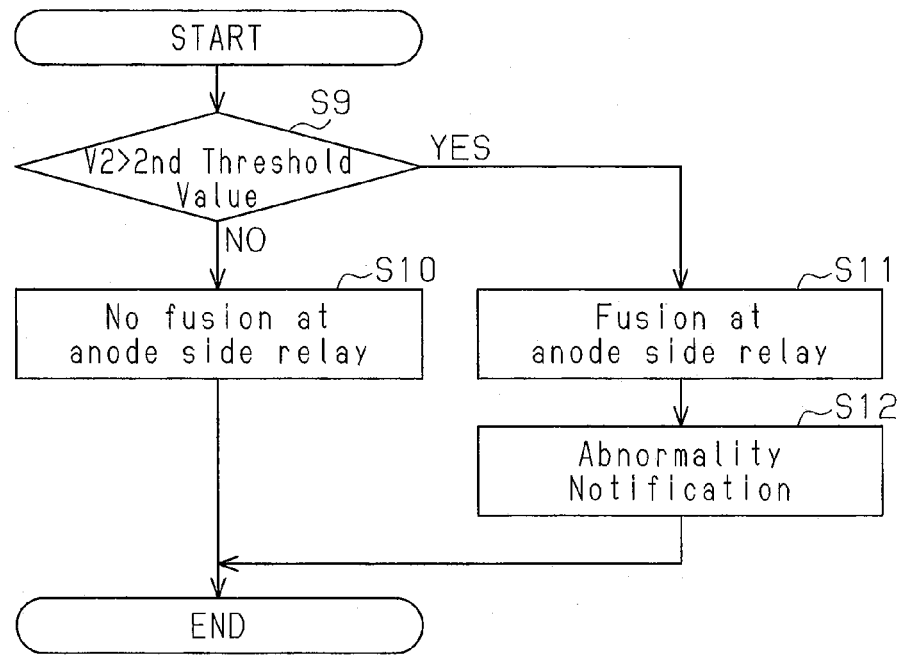
FIG. 8 is a flowchart showing a specific fusion checking process for the anode side relay in the relay fusion checking process shown in FIG. 5.

Referring to FIGS. 7 and 8, the cathode side relay and the anode side relay undergo the fusion checking process simultaneously and in parallel.

More specifically, the first relay fusion determination unit 34a compares the first voltage V1 acquired in step S3 and the first threshold value in the storage unit 36 in step S5 shown in FIG. 7. When the first voltage V1 is less than or equal to the first threshold value, the first relay fusion determination unit 34a determines that fusion has not occurred in the main relay 4 and the precharge relay 7 (step S6).

When the first voltage V1 is greater than the first threshold value in step S5, the first relay fusion determination unit 34a determines that fusion has occurred in at least either one of the main relay 4 and the precharge relay 7 (step S7) and issues an abnormality notification to the vehicle ECU 8 indicating that fusion has occurred in the cathode side relay (step S8).

Further, in step S9 shown in FIG. 8, the second relay fusion determination unit 34b compares the second voltage V2 acquired in step S3 and the second threshold in the storage unit 36. When the second voltage V2 is less than or equal to the second threshold value, the second relay fusion determination unit 34b determines that the fusion has not occurred in the main relay 5 (step S10).

When the second voltage V2 is greater than the second threshold value in step S9, the second relay fusion determination unit 34b determines that fusion has occurred at the main relay 5 (step S11) and issues an abnormality notification to the vehicle ECU 8 indicating that fusion has occurred in the anode side relay (step S12).

When the first and second relay fusion determination units 34a and 34b determine that fusion has not occurred on the cathode side relay and the anode side relay in steps S6 and S10, the relay control unit 33 in the battery ECU 3 provides the precharge relay 7 and the main relay 5 with a close signal at time T2 shown in FIG. 6. This closes the precharge relay 7 and the main relay 5, precharges the capacitor 9, and raises the inverter voltage. Then, when the relay control unit 33 provides the main relay 4 with a close signal at time T3 after a predetermined time elapses from time T2, the main relay 4 is closed. This starts the actual supply of power to the motor driving unit 2.

In the power supply device 100 of the present embodiment, the battery ECU (controller) 3 measures the first and second voltages V1, V2 and determines whether or not each of the cathode side relay and the anode side relay is fused when the main relay 4, the precharge relay 7, and the main relay 5 are all in an open state. In this manner, the cathode side relay and the anode side relay are all set in the open state when performing the fusion checking process on the cathode side relay and the anode side relay in the power supply device 100 of the present embodiment. Thus, the fusion checking process is performed simultaneously for the cathode side relay and the anode side relay in a manner independent from the motor driving unit (apparatus) 2 when the rechargeable battery B is electrically disconnected from the apparatus. This differs from the prior art example. Furthermore, a voltmeter or the like does not have to be arranged in the apparatus side. This also differs from the prior art example. Accordingly, in the power supply device 100 of the present embodiment, the fusion checking process for the cathode side relay and the anode side relay is easily performed within a short period of time regardless of the type, configuration, and the like of the apparatus.

Further, in the power supply device 100 of the present embodiment, the fusion checking process is performed without switching any of the main relays 4 and 5 and the precharge relay 7 to the closed state as shown at time T1 to time T2 in FIG. 6. Thus, the switching time (e.g., about 200 msec) necessary for switching each relay between an open state and a closed state is not necessary. Accordingly, the fusion checking process for the cathode side relay and the anode side relay is performed between time T1 and time T2 within a short period of time (e.g., about 50 msec).

A control program including the various processes shown in FIGS. 5, 7, and 8 is installed in and executed by the microcomputer of the battery ECU 3 in the present embodiment.

In the field of HEVs, the vehicle ECU may also function as the battery ECU. In such a case, the function of the battery ECU 3 in the above embodiment is realized by a control program including the various processes shown in FIGS. 5, 7, and 8 that is installed in and executed by the microcomputer of the vehicle ECU 8.

It should be apparent to those skilled in the art that the present invention may be embodied in many other specific forms without departing from the spirit or scope of the invention. Particularly, it should be understood that the present invention may be embodied in the following forms.

The power supply device of the present invention is applied to an HEV in the above embodiment. However, the power supply device of the present invention is not limited to such an application. The power supply device of the present invention may be used as various types of power sources. For example, the power supply device of the present invention may be applied to a motorized vehicle such as electric vehicle or a motorized wheelchair in which the power source is configured by only a motor, a backup power supply for an electronic device such as computer, or an electric device used outdoors.

In the preferred embodiment, the cathode side relay including the main relay and the precharge relay, which are electrically connected in parallel, is used for the cathode terminal of the rechargeable battery, and the anode side relay including the single main relay is used for the anode terminal of the rechargeable battery. However, the configuration and number of relays for each of the cathode side relay and the anode side relay are not limited in such a manner as long the cathode side relay and the anode side relay of the present invention are respectively arranged between the apparatus be supplied with power and the cathode terminal and anode terminal. More specifically, the precharge relay may be connected in parallel to the anode side main relay. Furthermore, a sub-relay, to which a current limiting resistor is series-connected, may be connected in parallel to the cathode side main relay even if the apparatus does not includes a capacitor.

In the preferred embodiment, the fusion checking process is performed on the cathode side relay and the anode side relay when starting the HEV. However, in the present invention, the fusion checking process may be performed on the cathode side relay and the anode side relay in a state in which all of the relays connected to the cathode terminal and the anode terminal of the rechargeable battery are open and the rechargeable battery is electrically disconnected from the apparatus. For example, the fusion checking process may be performed when the vehicle is in a still state after the relays in the cathode side relay and the anode side relay are all opened. Furthermore, the fusion checking process may be performed after short-circuiting occurs in the apparatus and the relays are all forcibly opened.

In addition to the preferred embodiment, two voltmeters for measuring the first voltage V1 between the high potential output terminal and the anode terminal of the rechargeable battery and the second voltage V2 between the low potential output terminal and the cathode terminal of the rechargeable battery, as shown by the arrowed double-dashed line in FIG. 3, may be arranged in the power supply device. In this case, the fusion checking process for the cathode side relay and the anode side relay is performed based on the measurement results of the two voltmeters when the cathode side relay and the anode side relay are in an open state. However, as described in the above embodiment, it is preferred that the first relay fusion determination unit performs the fusion checking process for the cathode side relay by measuring the first voltage V1 using the potential at the high potential output terminal and the potential at the anode terminal of the rechargeable battery respectively measured by the terminal voltage measurement unit and the supply voltage measurement unit, and the second relay fusion determination unit performs the fusion checking process on the anode side relay by measuring the second voltage V2 using the potential at the cathode terminal of the rechargeable battery and the potential at the low potential output terminal respectively measured by the terminal voltage measurement unit and the supply voltage measurement unit. In this case, the fusion checking process is simultaneously performed for the cathode side relay and the anode side relay, and the processing time of the relay fusion checking process is shortened.

Further, the fusion checking process is performed using the data measured by the terminal voltage measurement unit and the supply voltage measurement unit, which are originally necessary for the power supply device. Thus, the layout of exclusive electrical wires and voltage measurement units for measuring the first and second voltages is omitted. Accordingly, this is preferable in that the fusion checking process is performed without enlarging and complicating the internal circuit of the power supply device.

The power supply device and the method for controlling the power supply device of the present invention perform the fusion checking process on the cathode side relay and the anode side relay arranged between the rechargeable battery and the apparatus (external device) powered by the rechargeable battery. This is effective for a power supply device that supplies power from the rechargeable battery to the apparatus.

The present examples and embodiments are to be considered as illustrative and not restrictive, and the invention is not to be limited to the details given herein, but may be modified within the scope and equivalence of the appended claims.

What is claimed is:

1. A device for supplying power to an apparatus, the device comprising:
    a rechargeable battery including a cathode terminal and an anode terminal;
    a high potential output terminal for connection to the apparatus;
    a low potential output terminal for connection to the apparatus;
    a cathode side relay arranged between the cathode terminal of the rechargeable battery and the high potential output terminal;
    an anode side relay arranged between the anode terminal of the rechargeable battery and the low potential output terminal; and
    a controller for switching each of the cathode side relay and the anode side relay between an open state and a closed state, wherein the controller includes:
        a terminal voltage measurement unit, connected to the cathode terminal and the anode terminal of the rechargeable battery, for measuring potential at each of the cathode terminal and the anode terminal of the rechargeable battery to measure voltage between the terminals of the rechargeable battery;
        a supply voltage measurement unit, connected to the high potential output terminal and the low potential output terminal, for measuring potential at each of the high potential output terminal and the low potential output terminal to measure voltage supplied to the apparatus;
        a first relay fusion determination unit for obtaining a difference between the potential at the high potential output terminal measured by the supply voltage measurement unit and the potential at the anode terminal of the rechargeable battery measured by the terminal voltage measurement unit to measure a first voltage between a second side of the cathode side relay that is closer to the high potential output terminal and a first side of the anode side relay that is closer to the anode terminal of the rechargeable battery using potentials at the second side of the cathode side relay and the first side of the anode side relay when the cathode side relay and the anode side relay are set in the open state to determine whether or not the cathode side relay is fused, the first relay fusion determination unit determining that the cathode side relay is fused when the measured first voltage is greater than a first threshold value; and
        a second relay fusion determination unit for obtaining a difference between the potential at the cathode terminal of the rechargeable battery measured by the terminal voltage measurement unit and the potential at the low potential output terminal measured by the supply voltage measurement unit to measure a second voltage between a second side of the anode side relay that is closer to the low potential output terminal and a first side of the cathode side relay that is closer to the cathode terminal of the rechargeable battery using second potentials at the second side of the anode side relay and the first side of the cathode side relay when the cathode side relay and the anode side relay are set in the open state to determine whether or not the anode side relay is fused, the second relay fusion determination unit determining that the anode side relay is fused when the measured second voltage is greater than a second threshold value.

2. The device according to claim 1, wherein the cathode relay includes:
    a main relay including a first terminal connected to the cathode terminal of the rechargeable battery and a second terminal connected to the high potential output terminal; and
    a precharge relay including a first terminal connected to the cathode terminal of the rechargeable battery via a resistor and a second terminal connected to the high potential output terminal, wherein the precharge relay precharges the apparatus.

3. The device according to claim 1, wherein the rechargeable battery includes a battery pack formed by a plurality of series-connected cells.

4. The device according to claim 1, wherein the rechargeable battery is adapted for installation in a vehicle including a motor and supplies power to the motor.

5. A method for controlling a power supply device including a rechargeable battery having a cathode terminal and an anode terminal, the power supply device including a high potential output terminal and a low potential output terminal connected to an apparatus for power supply thereto, a cathode side relay arranged between the cathode terminal of the rechargeable battery and the high potential output terminal, and an anode side relay arranged between the anode terminal of the rechargeable battery and the low potential output terminal, the method comprising the steps of:

setting the cathode side relay in an open state;

setting the anode side relay in an open state;

measuring potential at each of the cathode terminal and the anode terminal of the rechargeable battery to measure voltage between the terminals of the rechargeable battery;

measuring potential at each of the high potential output terminal and the low potential output terminal to measure voltage supplied to the apparatus;

obtaining a difference between the potential at the high potential output terminal measured by the supply voltage measurement unit and the potential at the anode terminal of the rechargeable battery measured by the terminal voltage measurement unit to measure a first voltage between a second side of the cathode side relay that is closer to the high potential output terminal and a first side of the anode side relay that is closer to the anode terminal of the rechargeable battery while maintaining the cathode side relay and the anode side relay in the open state, the first relay fusion determination unit determining that the cathode side relay is fused when the measured first voltage is greater than a first threshold value;

obtaining a difference between the potential at the cathode terminal of the rechargeable battery measured by the terminal voltage measurement unit and the potential at the low potential output terminal measured by the supply voltage measurement unit to measure a second voltage between a second side of the anode side relay that is closer to the low potential output terminal and a first side of the cathode side relay that is closer to the cathode terminal of the rechargeable battery while maintaining the cathode side relay and the anode side relay in the open state, the second relay fusion determination unit determining that the anode side relay is fused when the measured second voltage is greater than a second threshold value, wherein the first and second voltage are measured simultaneously;

determining whether or not the cathode side relay is fused based on the measured first voltage; and determining whether or not the anode side relay is fused based on the measured second voltage.

6. The method according to claim 5, wherein:

the step of determining whether or not the cathode side relay is fused includes determining that the cathode side relay is fused when the measured first voltage is greater than a first threshold value; and the step of determining whether or not the anode side relay is fused includes determining that the anode side relay is fused when the measured second voltage is greater than a second threshold value.

7. A product for use with a computer for controlling a power supply device including a rechargeable battery having a cathode terminal and an anode terminal, the power supply device including a high potential output terminal and a low potential output terminal connected to an apparatus for power supply thereto, a cathode side relay arranged between the cathode terminal of the rechargeable battery and the high potential output terminal, and an anode side relay arranged between the anode terminal of the rechargeable battery and the low potential output terminal, the product comprising a computer-readable medium encoded with program logic which when executed by the computer causes the computer to perform steps including:

setting the cathode side relay in an open state;

setting the anode side relay in an open state;

measuring potential at each of the cathode terminal and the anode terminal of the rechargeable battery to measure voltage between the terminals of the rechargeable battery;

measuring potential at each of the high potential output terminal and the low potential output terminal to measure voltage supplied to the apparatus;

obtaining a difference between the potential at the high potential output terminal measured by the supply voltage measurement unit and the potential at the anode terminal of the rechargeable battery measured by the terminal voltage measurement unit to measure a first voltage between a second side of the cathode side relay that is closer to the high potential output terminal and a first side of the anode side relay that is closer to the anode terminal of the rechargeable battery while maintaining the cathode side relay and the anode side relay in the open state, the first relay fusion determination unit determining that the cathode side relay is fused when the measured first voltage is greater than a first threshold value;

obtaining a difference between the potential at the cathode terminal of the rechargeable battery measured by the terminal voltage measurement unit and the potential at the low potential output terminal measured by the supply voltage measurement unit to measure a second voltage between a second side of the anode side relay that is closer to the low potential output terminal and a first side of the cathode side relay that is closer to the cathode terminal of the rechargeable battery while maintaining the cathode side relay and the anode side relay in the open state, the second relay fusion determination unit determining that the anode side relay is fused when the measured second voltage is greater than a second threshold value;

determining whether or not the cathode side relay is fused based on the measured first voltage; and determining whether or not the anode side relay is fused based on the measured second voltage.

8. The product according to claim 7, wherein:

the step of determining whether or not the cathode side relay is fused includes determining that the cathode side relay is fused when the measured first voltage is greater than a first threshold value; and the step of determining whether or not the anode side relay is fused includes determining that the anode side relay is fused when the measured second voltage is greater than a second threshold value.

* * * * *